June 21, 1932. B. T. LEVEQUE 1,864,510
MACHINE FOR LASTING STITCHDOWN SHOES
Filed Nov. 24, 1930 12 Sheets-Sheet 1
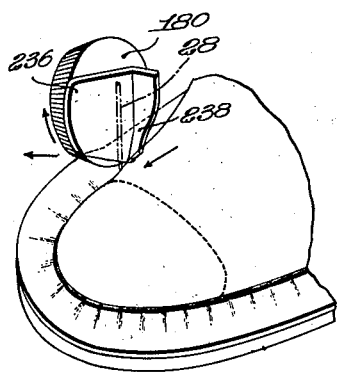
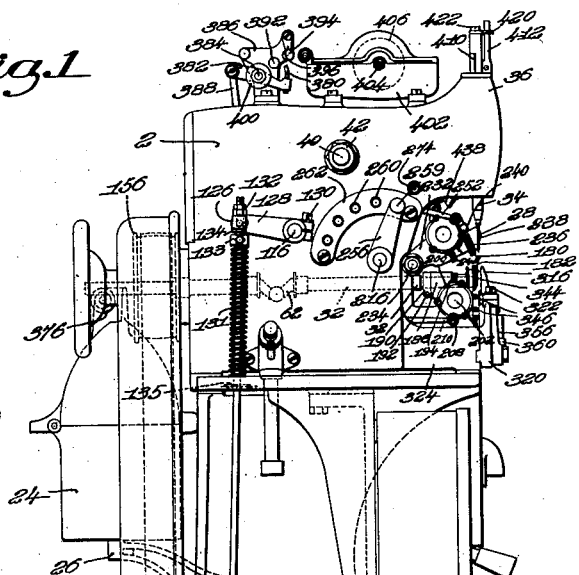

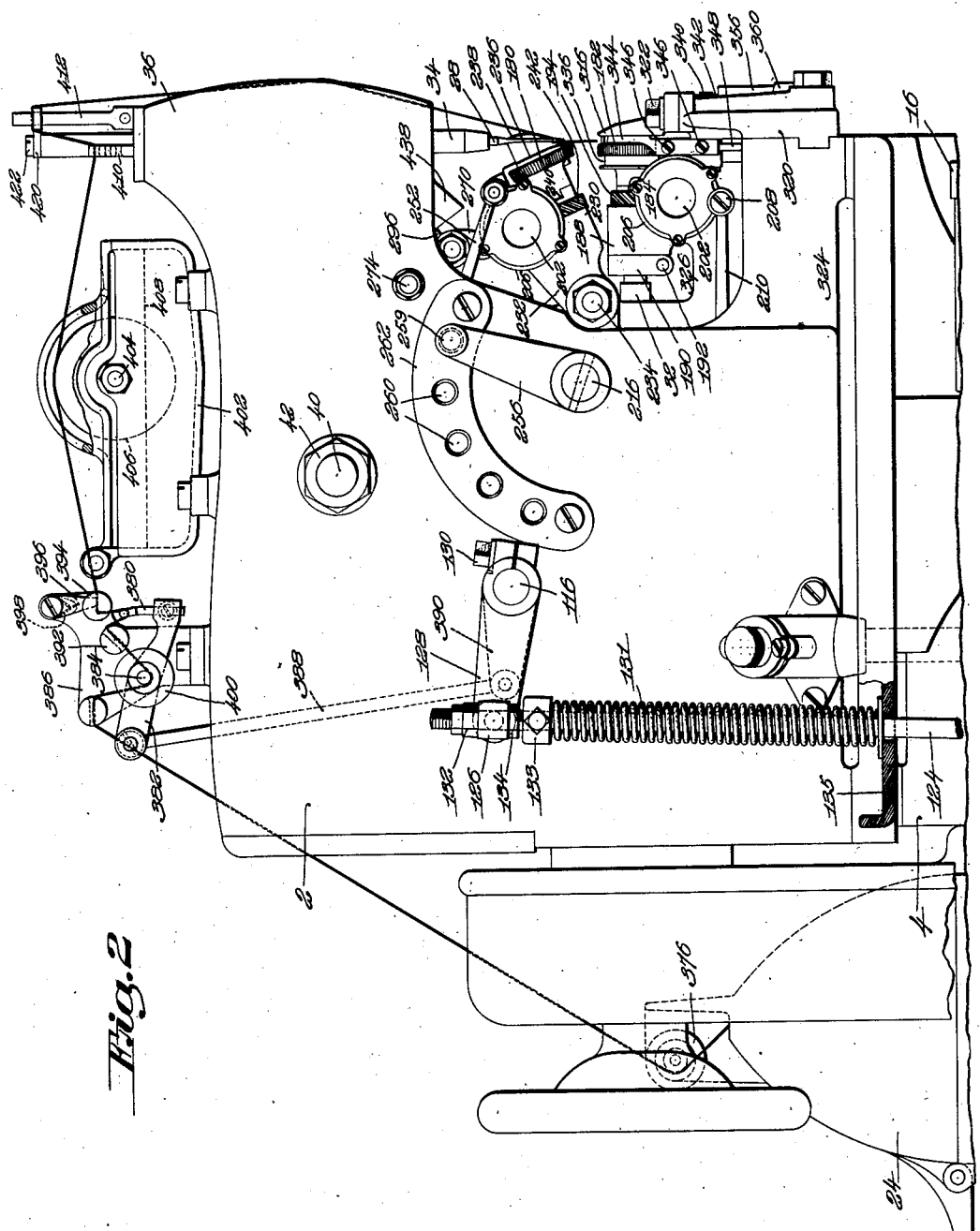

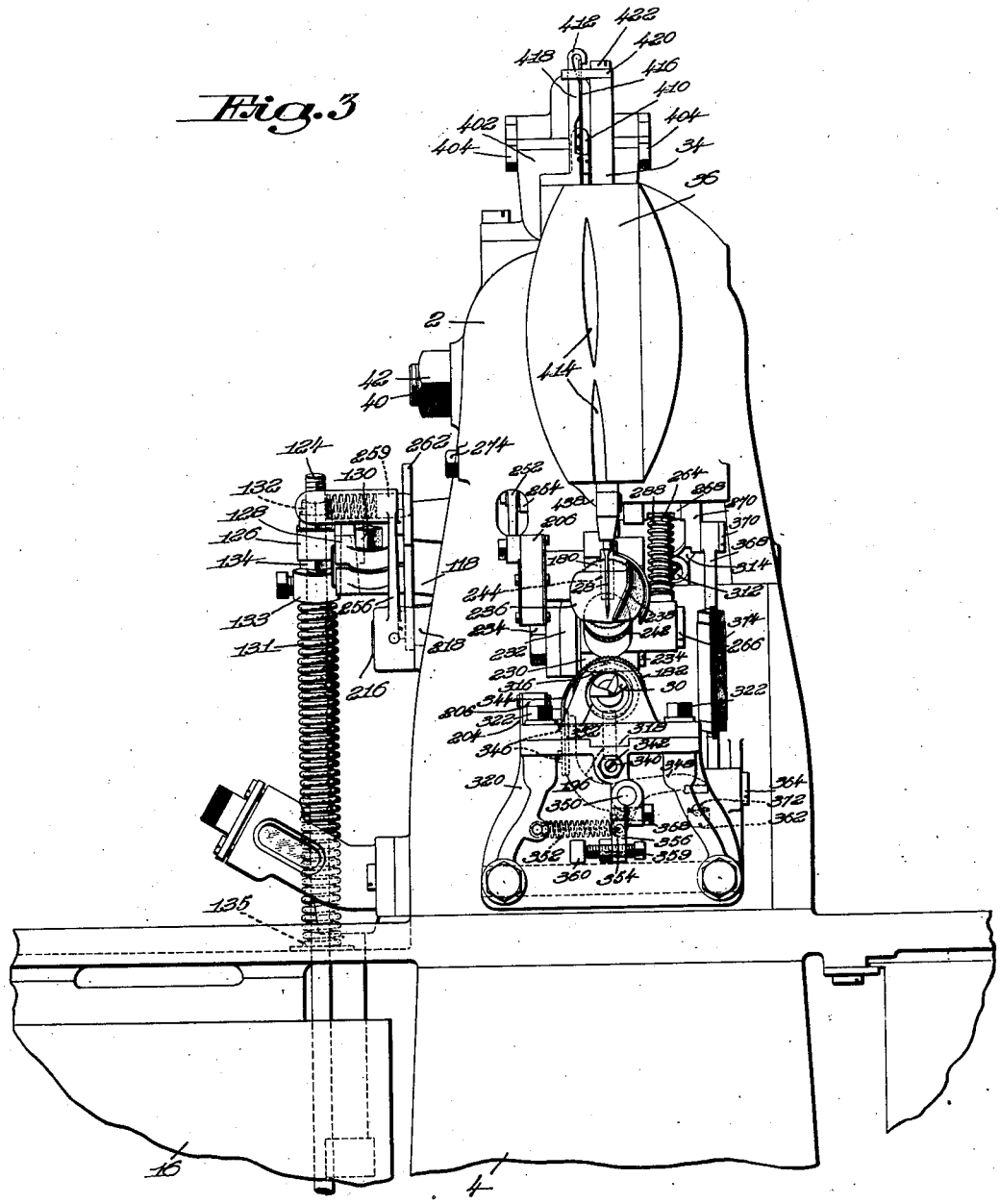

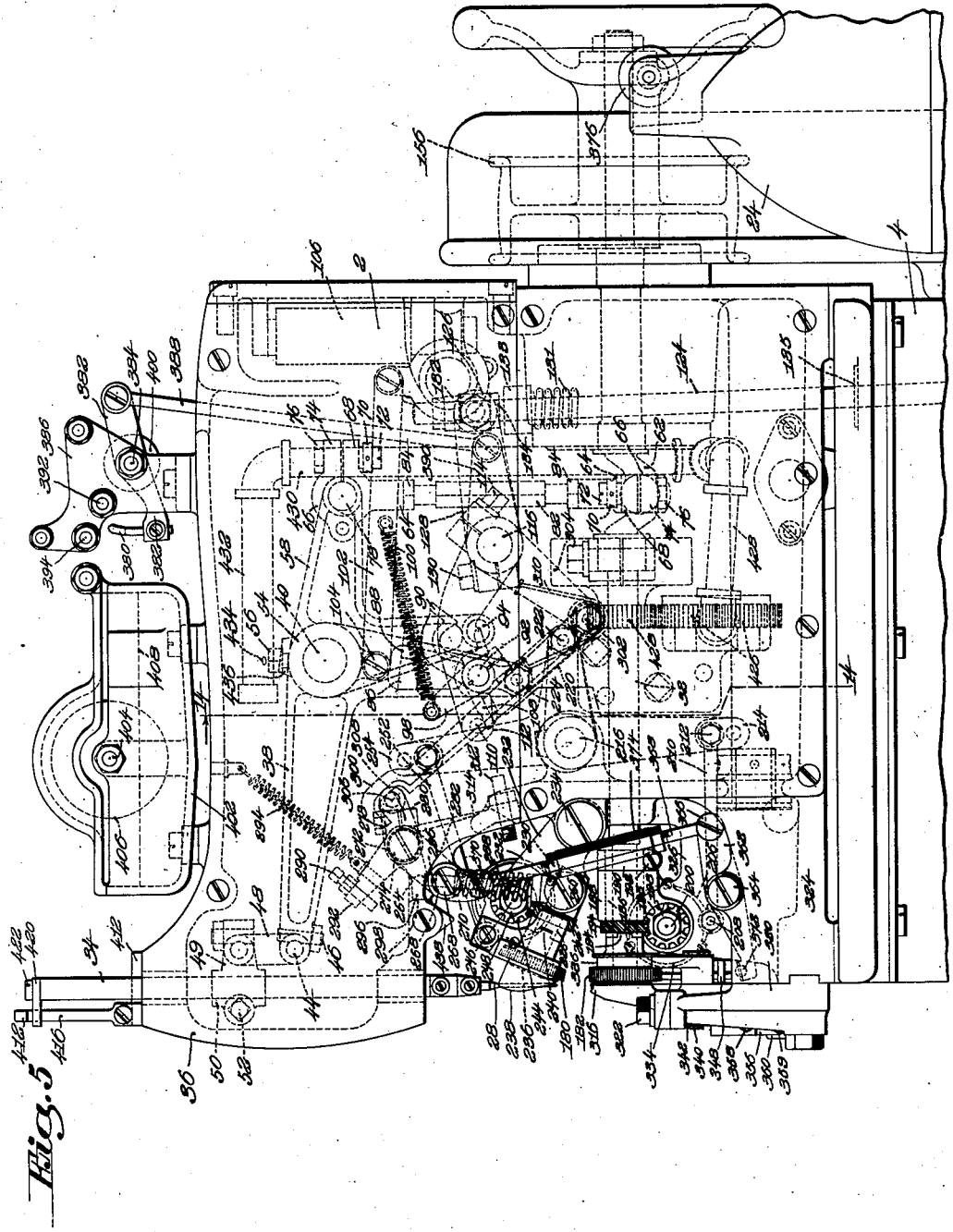

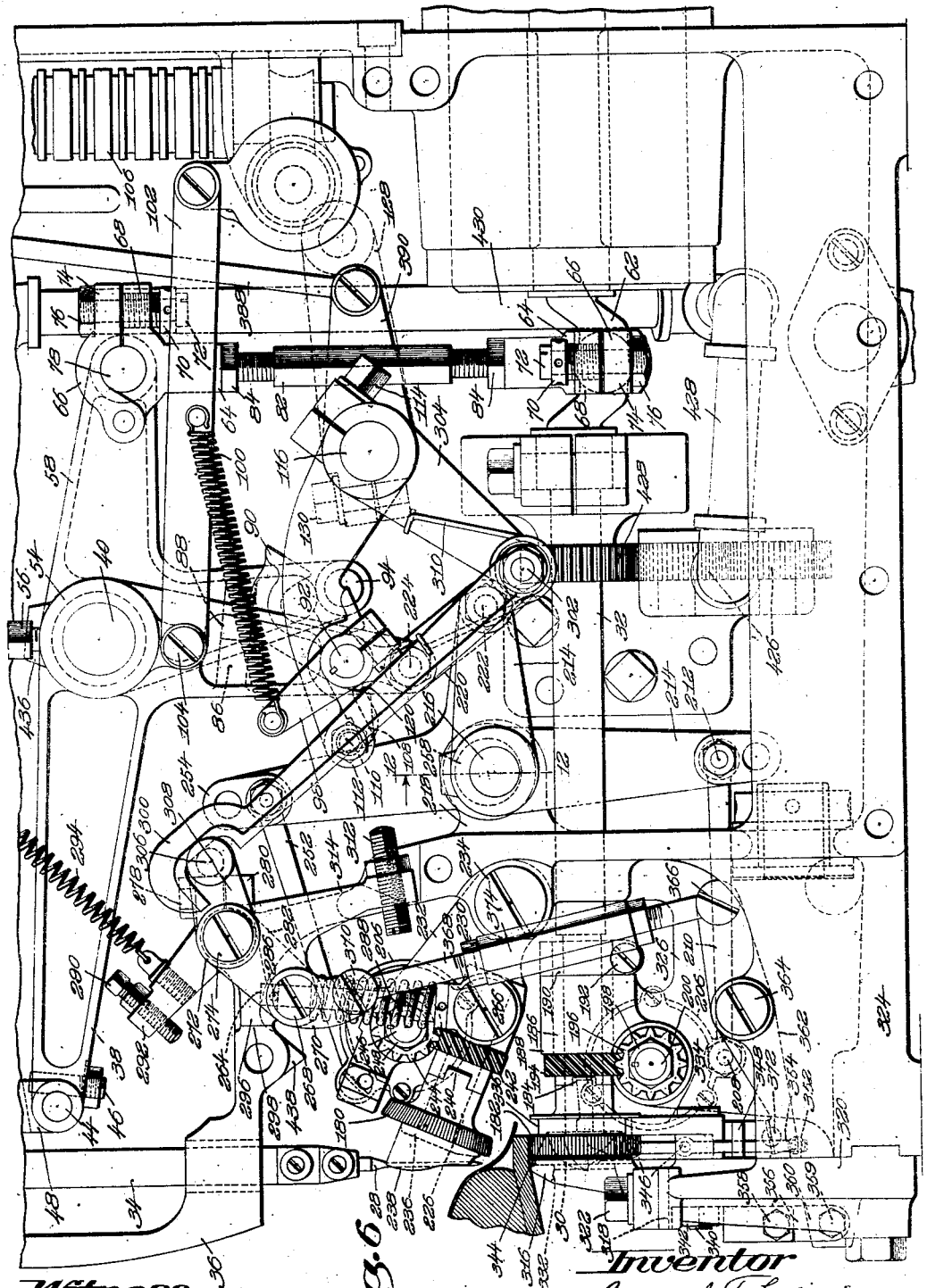

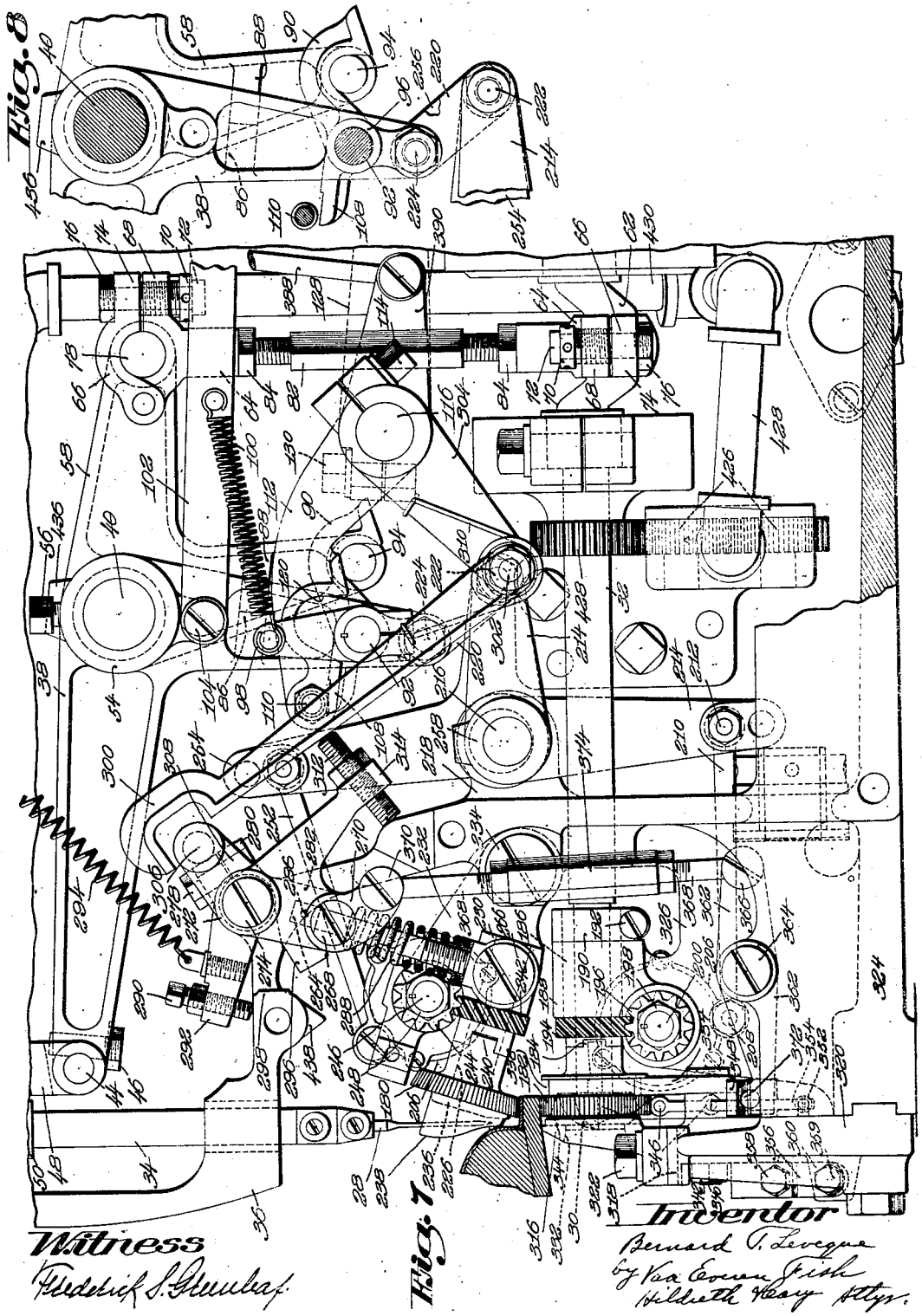

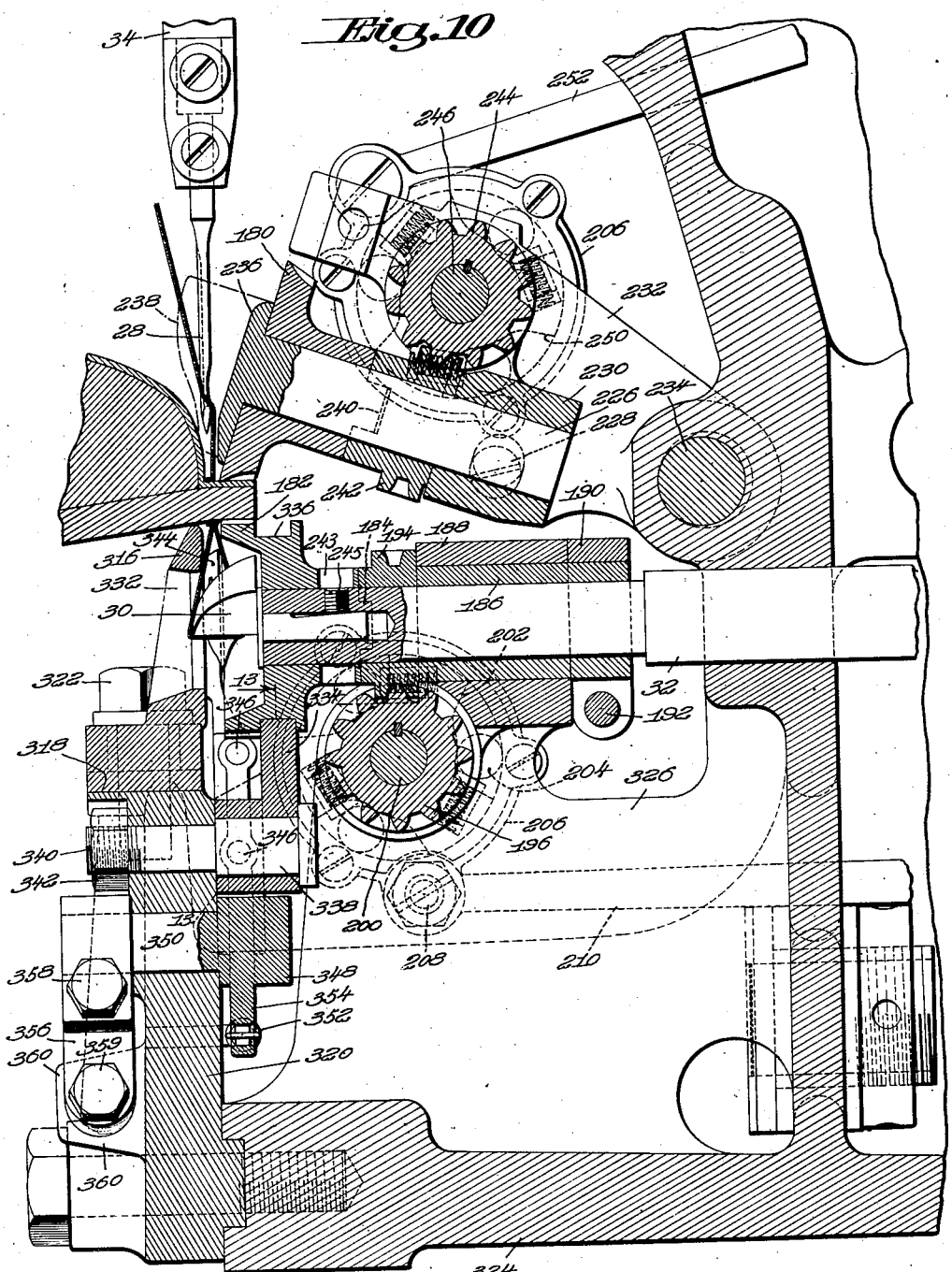

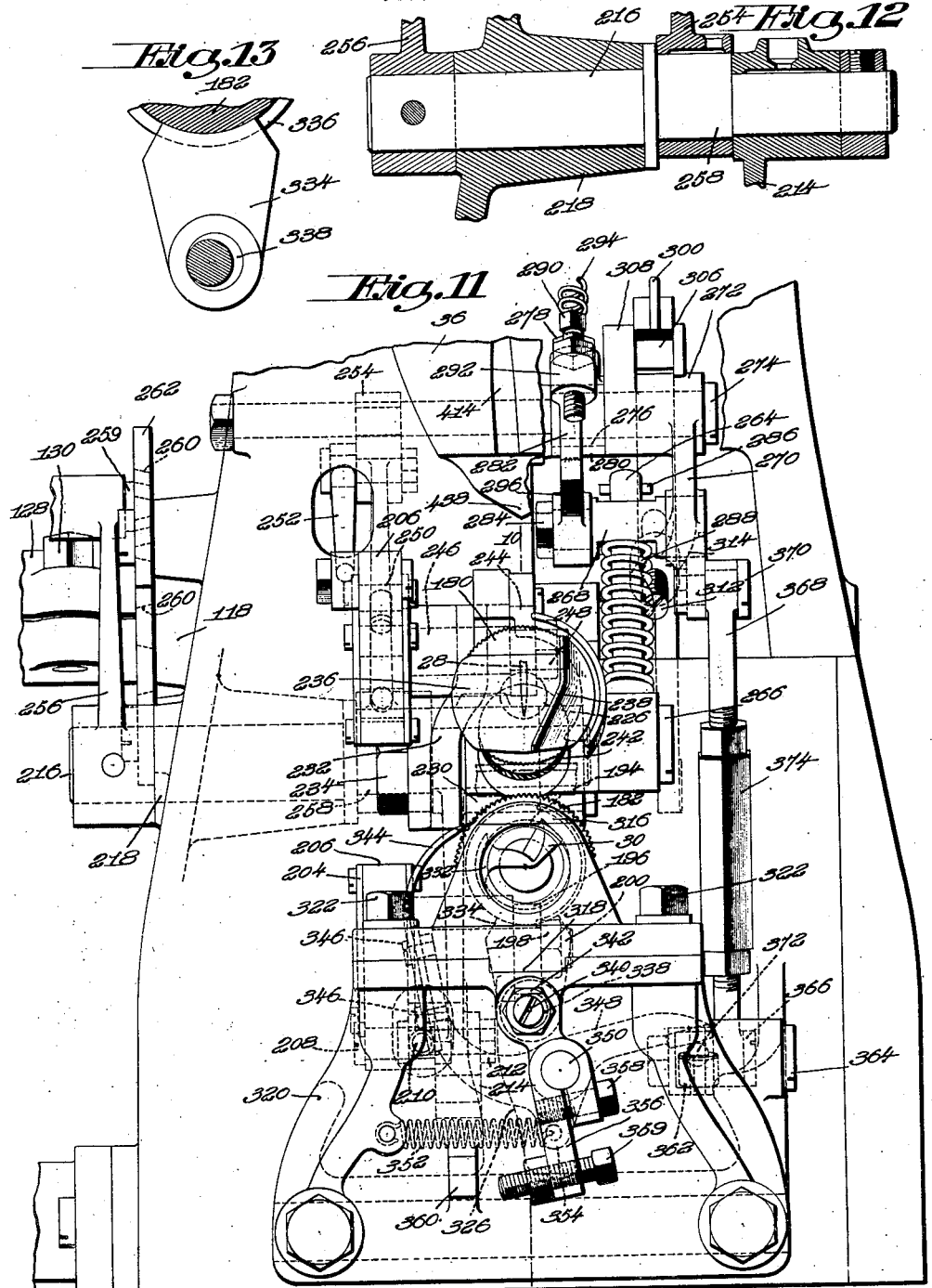

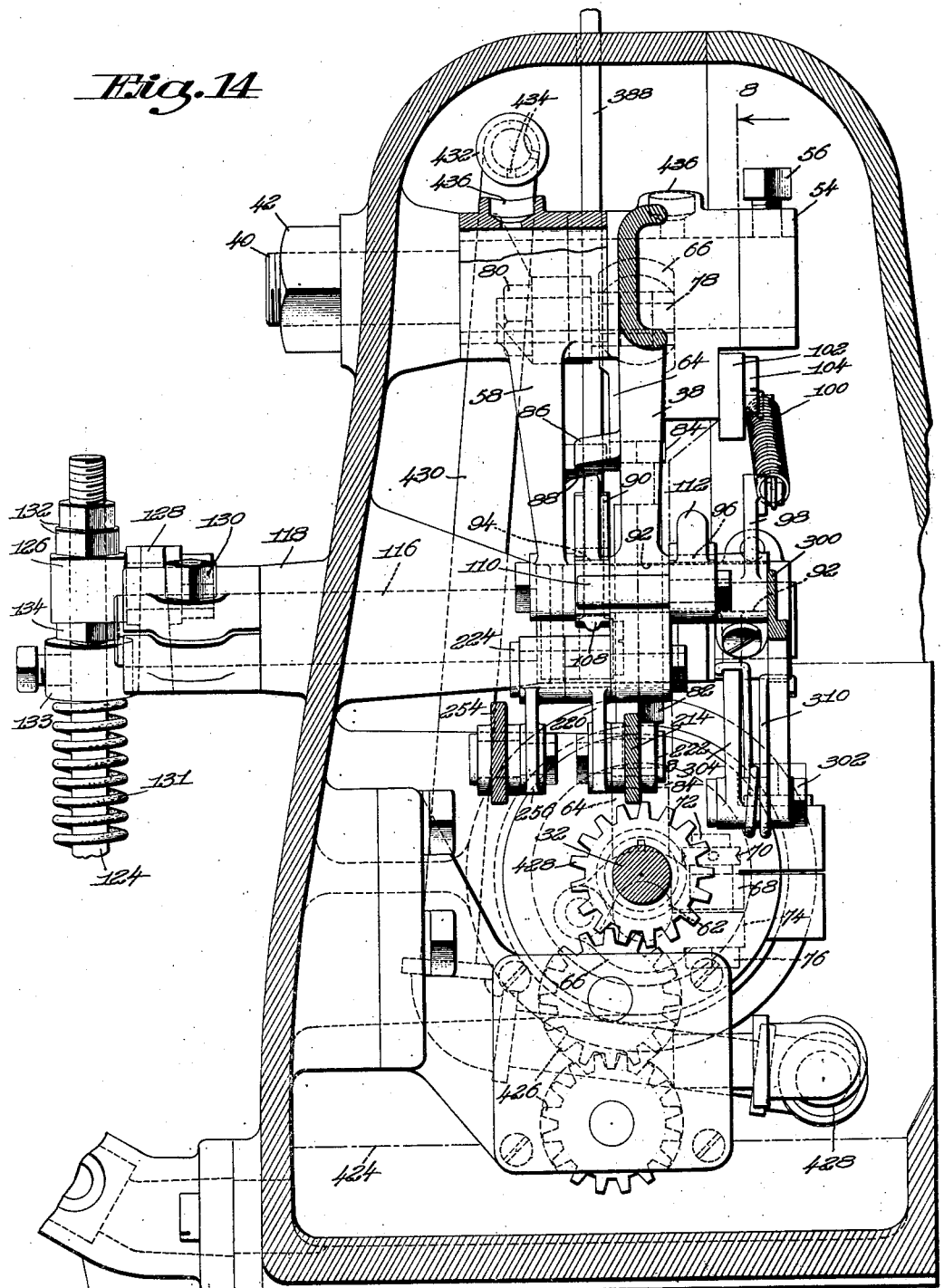

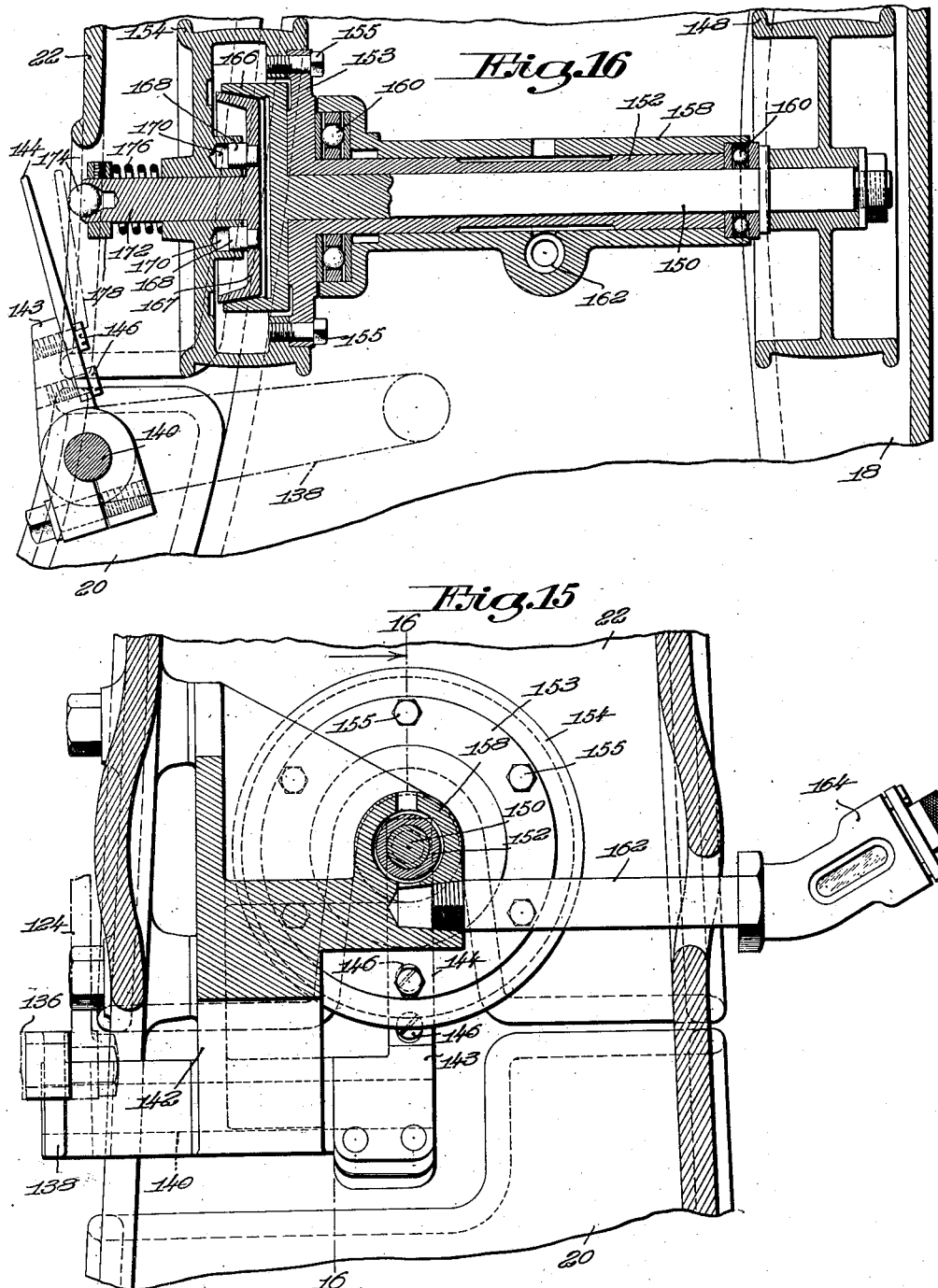

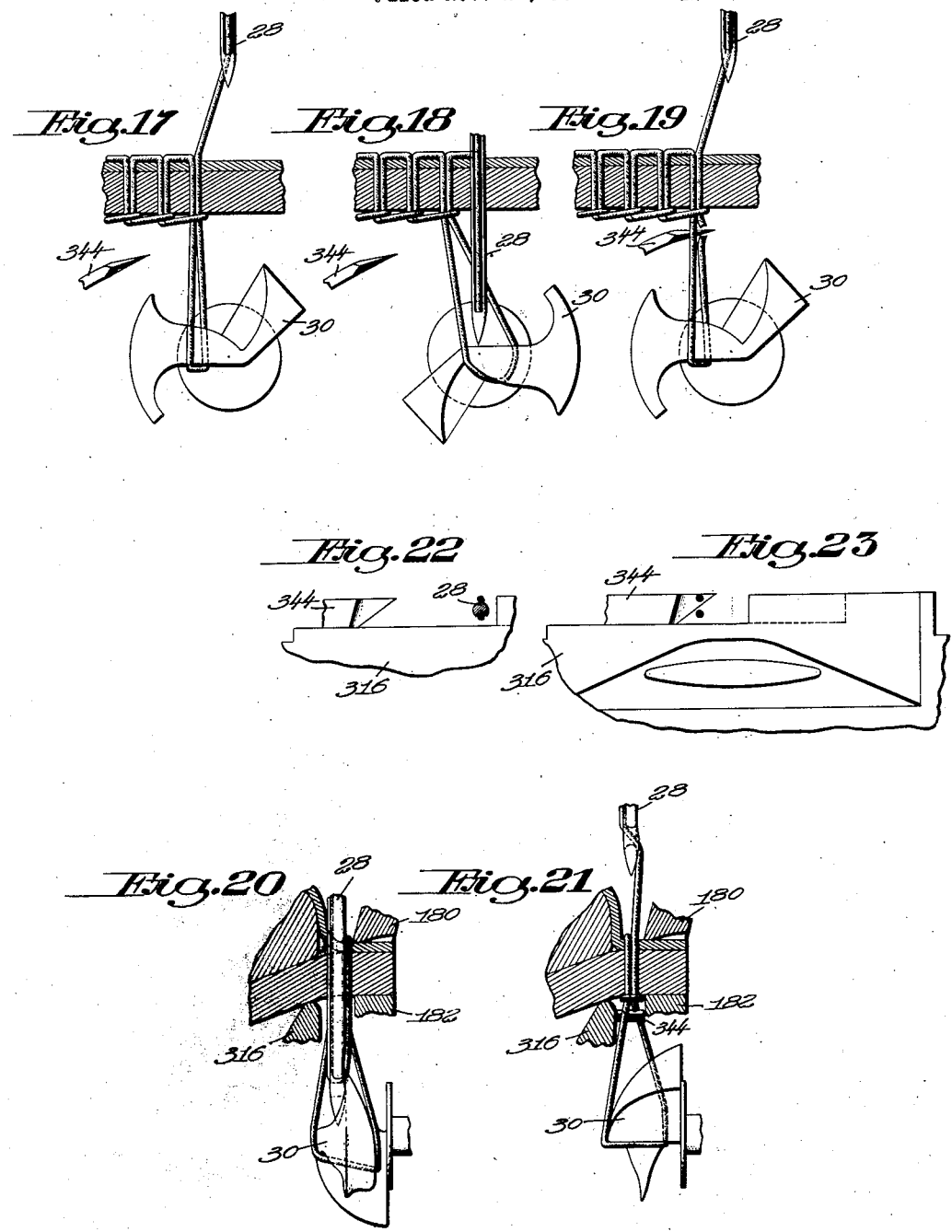

Patented June 21, 1932

1,864,510

UNITED STATES PATENT OFFICE

BERNARD T. LEVEQUE, OF WENHAM, MASSACHUSETTS, ASSIGNOR TO UNITED SHOE MACHINERY CORPORATION, OF PATERSON, NEW JERSEY, A CORPORATION OF NEW JERSEY

MACHINE FOR LASTING STITCHDOWN SHOES

Application filed November 24, 1930. Serial No. 497,809.

The present invention relates to machines for lasting stitchdown shoes and is herein shown and described as embodied in a machine in which the upper is drawn tightly over the last and is secured in lasted position by means of stitches.

The principal object of the invention is to provide a simple and efficient machine which will operate at a high rate of speed to draw the upper of a stitchdown shoe tightly over the last progressively along the shoe and secure the upper to the sole in lasted position. Other objects of the invention are to improve the construction and arrangement of parts of machines for lasting stitchdown shoes and also to provide certain improved devices and combinations of devices particularly designed for use in securing the upper of a stitchdown shoe in lasted position by means of a sewed seam, but also capable of advantageous use in machines for forming a seam in other classes of work.

With the above objects in view, an important feature of the present invention contemplates the provision in a machine for lasting stitchdown shoes, of a rotatable roll so arranged that its peripheral surface can engage the out-turned shoe upper, together with a cooperating member or work support, also preferably a rotatable roll, between which and the peripheral surface of the upper engaging roll, the out-turned upper and sole can be gripped. In combination with these work gripping members, means are provided for rotating the roll and guiding the work so as to draw the upper over the last and work it progressively into lasted position along the shoe. Preferably, as has been stated, the member which cooperates with the upper engaging roll to grip the out-turned upper and sole is also a rotatable roll, and in such case, means are preferably provided for rotating both rolls. In its broader aspects, the invention contemplates rotating the upper engaging roll or rotating both rolls, and guiding the work, in any suitable manner to cause the upper to be drawn over the last progressively along the shoe. A feature of the invention, however, contemplates rotating the upper engaging roll at such a speed as to cause its upper engaging surface to move with relation to the sole contacting surface of the cooperating roll or member in the direction of feed so as to effect what may be termed a gathering action to dispose of the fullness of the upper longitudinally about the last. Also, a feature of the invention contemplates the provision of means, the specific embodiment of which hereinafter described, consists of a guide arranged to engage the last supported upper for causing a movement of the shoe longitudinally of the upper engaging roll or transversely of the direction of feed as the shoe is fed. This movement of the shoe causes a pull transversely to the direction of feed to be exerted on the upper, the sole, which is secured to the last, slipping over the work supporting member or roll, while the upper is held by the upper engaging roll. The amount of this pull depends upon the extent of transverse movement of the shoe, and with the construction hereinafter specifically described, this transverse movement of the shoe can be regulated as desired by varying the angle at which the shoe is held by the operator with relation to the line of feed.

The present invention contemplates the provision of means for securing the shoe upper in lasted position, and in the embodiment of the invention hereinafter specifically described, this securing means comprises stitch forming devices for forming a seam securing the upper and sole together while gripped between the upper engaging roll and the sole engaging roll or member.

As illustrated, the stitch forming mechanism comprises a straight needle arranged for reciprocation in a path extending diametrically of the rolls between the rolls and the shoe, the acting face of the guide being at one side of and outwardly of the needle so that it acts to prevent contact of the shoe with the needle and enables the needle to penetrate the out-turned upper at a point substantially in the angle between the side of the last and the projecting margin of the sole. The rolls act continuously adjacent to the point where the upper is being secured by the seam to clamp the sole and upper together. When a shoe is fed by the rolls with the portion of the side of the shoe at the operating point held parallel to the direction of feed, the excess movement of the upper roll over that of the lower roll disposes of the fullness of the stock. At the same time successive portions of the upper and sole are clamped in the bite of the rolls and the formation of the stitch between the rolls and the side of the shoe causes the upper to be drawn tightly into the angle between the side of the last and the projecting margin of the sole. When the portion of the shoe at the operating point is held at an angle to the direction of feed, the guide and feed rolls cooperate to effect an incremental stretching of the upper at each operation of the rolls, the amount of stretch being directly proportional to the angle at which the shoe is held with respect to the direction of feed. Since the tension on the stock produced in one feed movement of the rolls is maintained by the continuous grip of the rolls, the tension produced by successive feed movements of the rolls is added to that already secured and the tension is thus cumulative up to a maximum determined by the tension required to produce slipping of the upper between the sole and the upper feed roll, this maximum tension being maintained as long as the shoe is held at an angle sufficient to produce it. The result is that the upper, while continuously held at the sewing point, is progressively drawn over the last depending upon the angle at which the shoe is held by the operator, that angle being readily controllable by him to vary the tension as required at different parts of the periphery of the shoe. The upper is thus lasted very tightly and uniformly during the progressive operation of securing the upper and sole together.

The stitch forming mechanism above referred to, in combination with the work feeding devices of the machine, while particularly adapted for use in performing a lasting and sewing operation on a stitchdown shoe, embodies certain novel constructions and arrangements of parts capable of use in sewing machines for operating on other classes of work and which are, therefore, considered to constitute features of the present invention which are not necessarily limited to use in a machine for lasting stitchdown shoes.

The machine hereinafter specifically described as embodying the features of invention above referred to is also provided with novel means for operating or controlling certain of the parts in stopping and starting the machine, such as the movement of the roll or rolls into and out of gripping engagement with the work, the stopping of the needle of the sewing mechanism at the limit of its upward stroke, and the severing of the thread in order to permit the work to be readily removed. In addition to these features of novelty, the machine also embodies features of invention consisting in certain constructions, combinations and arrangements of parts hereinafter described and claimed, the advantages of which will be apparent to those skilled in the art from the following description.

Referring to the accompanying drawings in which is illustrated a machine embodying the several features of the invention:

Fig. 1 is a side elevation of the entire machine;

Fig. 2 is a side elevation on a larger scale of the head alone;

Fig. 3 is a front view of the head shown in Fig. 2;

Fig. 4 shows in partly sectional manner the upper and insole of a stitchdown shoe assembled upon a last in the condition in which it is presented to the machine;

Fig. 5 is an elevation of the head viewed from the opposite side to that of Fig. 2, indicating the enclosed operating parts in dotted lines;

Fig. 6 is a side elevation on a larger scale than Fig. 5, showing the main operating parts with the side-plate removed, and with an assembled stitchdown shoe in position ready to be operated upon by the machine;

Fig. 7 is a view similar to Fig. 6 showing most of the parts thereof and showing their relation when acting to draw down the upper over the last;

Fig. 8 is a detail showing the needle bar disconnectible driving mechanism and the connections therefrom for actuating the lasting and feeding rolls;

Fig. 10 is a large-scale showing of the lasting and feeding rolls together with their driving mechanism, showing mainly in section, and illustrating their manner of operating upon the work, and also showing the stitch-forming devices;

Fig. 11 is a partial front view on an enlarged scale, showing the lasting and feeding rolls in their operating positions, and the mechanism for holding them in work-engaging relation;

Fig. 12 is a vertical section on line 12—12 of Fig. 6 on an enlarged scale;

Fig. 13 shows in vertical section on line 13—13 of Fig. 10 the retarding and supporting means for the lower feed roll, with its adjusting means;

Fig. 14 is a view in vertical section on line 14—14 of Fig. 5;

Fig. 15 is a view in vertical section on line 15—15 of Fig. 1, on a larger scale;

Fig. 16 is a view in vertical section on line 16—16 of Fig. 15;

Figs. 17, 18 and 19 are detail views illustrating somewhat diagrammatically the operation of needle, loop-taker, and thread-cutter in cutting the thread;

Figs. 20 and 21 are detail views looking from the right, of the parts illustrated in Figs. 18 and 19;

Figs. 22 and 23 are detail plan views showing the thread cutter and the thread loop which is being cut in the position indicated in Figs. 18 and 19;

Figure 9:
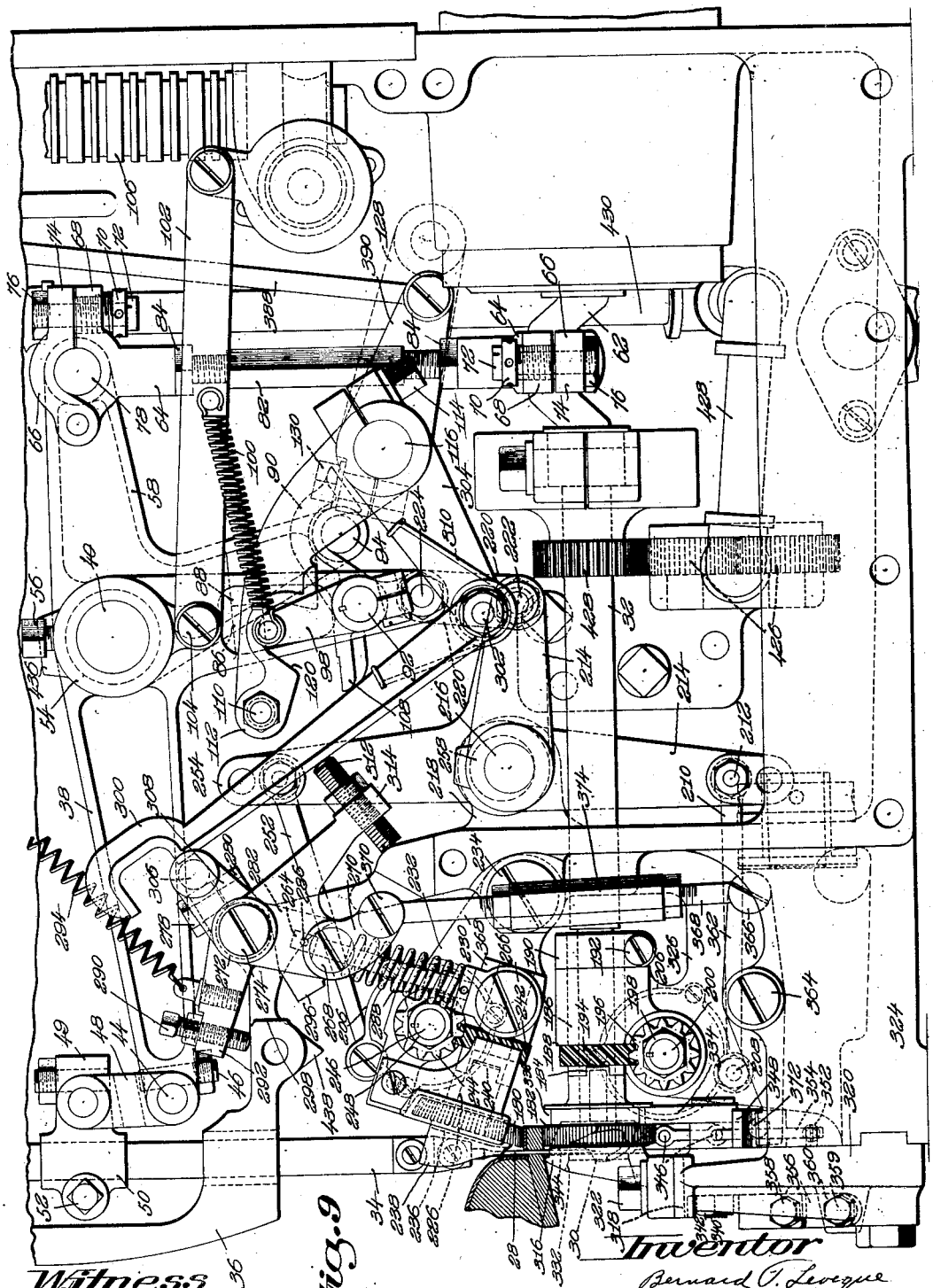
Fig. 9 is a view similar to Fig. 7 showing the relation of the parts as the needle pierces the work.

And Figs. 24 and 25 are diagrammatic views illustrating the manner in which the upper is drawn over the last and secured in lasted position.

The machine illustrated in the drawings comprises a head 2 that is supported upon a pedestal 4 which houses the driving motor 6 together with the belts 8, 10, and the clutch 12 that is controlled by the starting and stopping treadle 14. A starting box 16 for the electric driving motor is attached to the pedestal, and appropriate covers 18, 20, and 22 are provided to enclose the moving parts. A holder 24 to receive a package of the thread used in the stitching operation is mounted upon a bracket 26 fixed to the side of the pedestal.

The stitch-forming devices comprise an eye-pointed straight needle 28 and a rotating loop-taker 30 of familiar design, the latter being fixed upon one end of the shaft 32 of the machine and cooperating with the needle to form a single-thread chain stitch. The needle bar 34 is mounted in bearings in the frame 36 of the machine with capacity for movement up and down. It is actuated by means of a bell crank 38 pivoted on a stud 40 fixed in the frame of the machine by a nut 42, Figs. 2 and 14, one end of the bell crank being provided with a wrist pin 44, Fig. 9, held in place by a draw bolt and nut 46, the wrist pin passing through the forked end of a link 48 which is similarly pivoted upon a wrist pin likewise fixed by a draw bolt in a lug 49 upon a split collar 50 that is clamped upon the needle bar by means of a clamping screw 52. A collar 54, Fig. 14, is fixed on the end of the stud 40 outside of the bell crank 38 by means of a clamping screw 56, and serves to retain the bell crank in place upon the stud. Alongside the bell crank 38 upon the stud 40 there is pivoted a second bell crank 58 which is adapted, by means to be described, to actuate the first bell-crank, and is driven by a connecting rod attached at its lower end to a cranked portion 62 of the shaft 32, such cranked portion having a spherical bearing surface to which is applied the socket 64, Figs. 9 and 14, and a hinged cap 66, so as to form a ball-and-socket joint between the crank and the connecting rod. A lug 68 on the socket 64 is provided with a bushing 70 screw-threaded into it to project an adjustable amount and act as a stop limiting the closing of the hinged cap 66 toward the lug 68 upon tightening the bolt 72 which extends through the bushing and is threaded into the corresponding lug 74 of the cap. A lock nut 76 is applied to the end of the bolt 72. This same construction is used at the upper end of the connecting rod, the bell crank 58 being provided with a ball 78 having a reduced shank-portion which is put through the end of the bell crank and fixed in place by tightening a nut 80, Fig. 14, applied to its screw-threaded extremity. Provision is made for adjusting the length of the connecting rod to adjust the stopping-point of the needle at the end of its downward movement by forming the intermediate portion of the length of the connecting rod as a separate member 82 having its reduced extremities screw-threaded in opposite directions and threaded into the socket portions 64, lock nuts 84 being applied to maintain the adjustment.

The means for driving the bell-crank 38 from the bell-crank 58 which is oscillated by the connecting-rod, comprises a pair of co-engaging lugs 86 and 88 formed respectively on such bell-cranks 38 and 58, Fig. 14, and a latch 90 pivoted at 92 on the bell-crank 38 and adapted to hook over a pin 94 in the free end of bell-crank 58. When the latch is engaged with the pin 94, the lugs are held in close contact with each other, and the two bell-cranks act as a single lever transmitting reciprocatory motion from the connecting rod to the needle-bar 34.

The latch 90 is fixed upon its pin 92 which is mounted for rotation in a sleeve 96 formed for it in the free end of the bell-crank 38, and an arm 98 is also fixed upon this pin to the extremity of which is attached a contracting spiral spring 100 which is affixed to a link 102 connected at 104 to such bell-crank and serving to operate a stitch-counter indicated at 106. The spring 100 acts to keep the latch engaged with its pin 94 during the rapid oscillation of the bell cranks. The latch is equipped with a tail 108 adapted to be depressed to unhook the latch and suspend operation of the bell crank 38 and the connected needle bar when the stitching action is to be stopped. To operate the latch, a pin 110 is fixed in the end of an arm 112 fast on a treadle controlled rock shaft 116 which extends transversely out from the side of the machine through a bearing 118, Fig. 14, formed in the frame. The arm 112 is provided with a notch 120 which slips over the sleeve 96 when the needle bar is at the top of its stroke, the entry of such sleeve within the notch 120, permitting the downward movement of arm 112 to bring its pin 110 into engagement with the tail 108 of the latch to free it from the pin 94 on the driving bell-crank 58. This arrangement provides means for stopping the needle-bar even when driven at extremely high speed without appreciable shock or jar, the needle-bar being disconnected from the driving means and held at rest at the exact instant when it is changing its direction at the end of its upward movement. The needle is thus merely held in the position of rest at which it has already arrived, while the driving means represented by the bell-crank 58, the connecting rod and the shaft 32 are losing their momentum, and gradually coming to rest.

The rock-shaft 116 is connected with the starting and stopping treadle 14 by means of links 122 and 124, the latter link passing through a swivelling eye 126 at the end of an arm 128 fixed by means of a clamping screw 130 to the outer end of the shaft 116. An expanding spiral spring 131, confined between a collar 133 secured to the link 124 and the surface of a table 135, through which such link passes, tends to lift the arm 128 and rotate the shaft into its stopping position. Nuts 132, 134 are applied to the threaded end of link 124 at each side of the swivelling eye 126 and the meeting ends of the two links 122, 124 pass through swivelling eyes 136 on the end of an arm 138 clamped upon a jackshaft 140 rotating in a suitable bearing in the end of an arm 142 extending outwardly from a bracket affixed to the interior of the pedestal approximately midway of its height. Upon this jackshaft is clamped a second arm 143, Figs. 15 and 16, having attached to it by screws 146, a finger 144 which serves to operate the clutch which transmits driving power from the constantly-driven motor 6 to the head 2 of the machine. This clutch unit comprises a driving pulley 148 connected by belt 8 with the driving motor 6 and fixed on the shaft 150 rotating in a sleeve 152 which has an integral flange 153 to which is secured by bolts 155 the driven pulley 154 over which passes the belt 10 delivering power to a pulley 156 fixed on the shaft 32 of the head. This sleeve 152 rotates within a long bearing 158 in the bracket, suitable ball thrust-bearings 160 and an oil-duct 162 and reservoir 164 being provided in connection with such bearing 158. The female member 166 of the clutch is integral with the shaft 150, while the male member 167 cooperating therewith is equipped with studs 168 received within appropriate recesses 170 in the driven pulley 154 and also with an axial stud 172 which extends out through the center of such driven pulley and terminates with an antifriction ball 174 against which the finger 144 which operates the clutch takes bearing. An expanding spiral spring 176 surrounds the stud 172 and is confined between the hub of the driven pulley and a collar 178 affixed to the end of the stud by a clamping screw, said spring acting to disengage the male member 167 from the female member of the clutch to suspend the transmission of power when the pressure of the finger 144 against the ball in the end of the stud 172 is relieved.

While the treadle 14 is up, the shaft 116 occupies the position shown in Fig. 6 in which the arm 112 is lowered and its notch 120 engaged with the sleeve 96 on bell-crank 38, while the latch 90 is unhooked and raised. When the treadle is depressed, the resulting turning of the shaft 116 lifts the arm 112 through the position shown in Fig. 7 and into that of Fig. 9, the latch meanwhile being released from the restraint of pin 110 and descending onto its pin 94, its hook either slipping over such pin 94 directly or doing so as soon as the first movement of bell-crank 58 resulting from the engagement of the clutch, brings the pin 94 into position. Thereafter the two bell-cranks move in unison to drive the needle-bar as shown in Fig. 9, so long as the treadle remains depressed and the clutch engaged. As is obvious, when the treadle is released to rise again, the clutch is disengaged and the parts again assume the relation of Fig. 6.

For effecting the lasting of a stitchdown shoe there is provided in connection with the parts above referred to the novel mechanism which will now be described for drawing the upper over the last. Such mechanism, as illustrated, comprises a pair of intermittently rotated rolls 180, 182, adapted to grip between their peripheral surfaces the marginal portions of the upper and sole of a stitchdown shoe, see Fig. 10, after these parts have been assembled on a last as shown in Fig. 4. The lower roll 182 is mounted directly upon the reduced forward end of the shaft 32, with capacity for rotation with respect to the shaft, the rear end of its hub having lugs 184 received within appropriate notches in the front end of a sleeve 186 which also fits upon the shaft with capacity for free rotation. A hole 243 extending diametrically through the hub of the roll gives access to the clamping screw 245 which retains the shank of the looper 30 in place in the axial bore formed for it in the end of the shaft 32. The sleeve 186 is fitted within a bearing 188 in connection with the machine frame, being held against axial movement by a collar 190 clamped upon an end of the sleeve by a screw 192, and by a portion of increased diameter on which is formed a helical gear 194. With this gear is engaged a second helical gear 196, fixed by means of a key and a nut 198 upon one end of a short shaft 200 extending crosswise of the machine in a bearing formed for it in the frame just below the reduced end-portion of the shaft 32. The shaft 200 is intermittently rotated by mechanism including a Horton clutch comprising a driven member 202 fast on the shaft, a driving member 206 enclosing the driven member, and rolls 204 interposed between the two members. The driving member 206 is pivotally connected by a screw 208 with a link 210 that is attached at 212 to the lower arm of a bell-crank 214 that is pivoted upon a shaft 216 rotatably mounted in a bearing 218, Fig. 12, in the side of the frame. The other end of this bell-crank 214 is attached by a link 220 and pins 222 and 224, Figs. 8 and 14, to the lower end of the needle-bar actuating bell-crank 38. The arrangement is such that as the needle-bar rises the link 220 pulls up the horizontal arm of bell-crank 214, moving the other arm and its attached link 210 rearward and rotating the lower roll 182 in a counter-clockwise direction as viewed from the front, Figs. 3 and 11, through the Horton clutch and the helical gear 194. It will be noted by comparing the relative positions of the link 210 in Figs. 6 and 9 that the link 220 is inclined a little past centers when the needle is all the way down; thus the needle is raised clear of the work, on its way up, before the top end of the link has been carried sufficiently far forward toward the position of Fig. 6 to transmit any material actuating movement to the bell-crank 214 to rotate the roll and start feeding.

The top roll 180 is mounted to rotate upon a stud 226 fixed by a clamping screw 228 in a socket 230 formed for it upon a member 232 that is pivoted at 234 upon the machine frame. The inner end of the hub of the top roll 180 is provided with lugs 240 which are received within appropriately shaped notches in the end of the hub of a helical gear 242 that is also mounted for rotation upon the stud 226, between the top roll and the socket 230. This helical gear is driven to rotate the top roll 180, by means of a co-engaging helical gear 244 that is fixed by a key and the nut 248 upon one end of a shaft 246 which is rotatably supported in a bearing extending cross-wise of the member 232. Upon the other end of this shaft 246 is formed the driven member 250, Fig. 10, of a Horton clutch similar in every respect to the one employed to drive the lower roll. As in the case of the lower roll, the driving member or casing of this clutch is pivotally connected with a link 252 which is attached at its other end to a bell-crank 254 pivoted on shaft 216 alongside the bell-crank 214 that drives the lower roll. The other end of bell-crank 254 is connected by a link 256, Figs. 8 and 14, to the lower end of the needle-bar actuating bell-crank 38, this link being pivoted on pin 224 alongside the link 220.

On referring to Fig. 12, it will be seen that the bell-crank 254 is mounted on a portion 258 of the shaft 216 that is eccentric with respect to the shaft's bearing 218 and to that portion of the shaft upon which is mounted the bell-crank 214 that drives the lower roll. As shown in Fig. 2, the end of this shaft 216 is equipped with a handle 256 pinned to it and equipped with a spring-plunger 259 adapted to engage any one of a series of holes 260 in a segment 262 affixed to the outside of the machine. This arrangement permits and maintains adjustment of the angular relation of shaft 216 over about 90 degrees. The effect of such adjustment is to move the axis of the eccentric portion 258, and consequently the center on which the bell-crank 254 driving the top roll swings, towards or from the end of the needle bell-crank 38 to which it is attached by link 256. The result is to vary the sharpness of the inclination of the link 256 with respect to the vertical as the needle bell-crank reaches the end of its throw in lifting the needle-bar, and hence to vary the extent of angular movement of the bell-crank 254 and the resulting amount of rotation of the top roll as imparted by the Horton clutch. This adjustment permits of variation of the relative rate of feeding rotation of the two feed rolls, particularly of the amount by which the top roll exceeds the lower roll.

The illustrated machine is provided with means for bringing the feed rolls into gripping engagement with the work, for holding them in this relation during the operation on a shoe, and for separating them to permit entry and removal of the work. These means comprise a toggle connected to the member 232 in which the upper roll 180 is mounted. One member of this toggle consists of a pin 264 that is pivotally attached by a screw 266 to the side of the socket 230 on the member 232, this pin sliding through a hole in the shank of a swivelling stud 268 having one of its ends rotatably mounted (Figs. 6 and 11) in a bearing in an arm 270 forming a portion of a member 272 that is pivoted upon a stud 274 fixed in the machine frame. This member 272 has a portion of its hub reduced as indicated at 276, Fig. 11, upon which is clamped, by a bolt 278, the split hub of a member 280 having a depending arm 282 in the end of which the reduced and shouldered end of the swivelling stud 268 is mounted rotatably by means of the nut 284. The pin 264 is provided with a stop-pin 286 through its end above the swivelling pin 268, so that when the member 272 is swung in one direction about its stud 274, the stop pin will engage the pin 268 and through the pin 264 the member 232 will be lifted and the top roll moved away from the lower roll. An expanding spiral spring 288 surrounds the pin 264, confined between the hub at the lower end of such pin and the swivelling pin 268, and serves to press the top roll yieldingly against the work, to avoid damage to the shoe upper and to allow the roll-spacing to adapt itself to varying thicknesses of work. Also, this spring serves to hold the rolls and associated parts in work-clamping relation as shown in Fig. 9, since the center of the swivelling pin 268 is arranged to pass beyond the line joining the centers of stud 274 and the pivot-screw 266 as the member 272 is rocked to bring down the top roll, the parts being stopped in this relation by the engagement of an adjustable stop-screw 290 in the end of an arm 292 on the member 280 with a portion of the frame. Thus the top roll is brought down to clamp the work by means of a toggle action which easily overcomes the relatively stiff spring 288, while the spring itself serves to hold the toggle in locked relation with the rolls firmly clamping the work. A contracting spiral spring 294 is applied to the arm 292, and acts, when the toggle is broken, to help rotate the member 272 and lift the top roll well away from the lower roll, a lug 296 on the arm 282 bringing up against a shoulder 298 on the frame to limit this rotation of the member 272. But this spring is not powerful enough to break the toggle against the push of spring 288, after such toggle has been locked.

The means for effecting the lowering and bringing about the raising of the top roll comprises a hook 300 that is pivoted by means of a bolt and nut 302 upon the end of an arm 304 that is clamped by means of a screw 114 upon the end of the treadle controlled rock-shaft 116. This hook is adapted to engage a stud 306 projecting laterally from an arm 308 on the top of member 272, the hook being equipped with a spring 310 coiled about its hub and acting to hold the hook against the stud. When the machine is at rest with the treadle up, the hook 300 is engaged with the stud 306, as shown in Fig. 6. When the treadle is depressed, the resulting rotation of the rock shaft 116 moves the hook endwise away from the rock-shaft, and the hook rotates the member 272 until the toggle linkage is carried past center. During the brief moment after the toggle has passed center and before the stop-screw 290 has touched the frame of the machine, the spring 288 is propelling the member 272, instead of the hook, since the top roll has already encountered the work and the latter's resistance has compressed this spring more or less. At this moment the hook is disengaged from the stud by the push of a screw 312 threaded through the end of an arm 314 on the member 272, the light hook being easily unhooked in this manner while the stud's resistance to movement is thus relieved.

In this fashion the parts assume the relation shown in Fig. 9 with the toggle straightened and locked, and the top roll pressed firmly down upon the work. Also at this time the pin 110 on the arm 112 has been lifted away from the tail of the latch 90 and the latch has dropped over the pin 94 to couple the needle actuating bell crank 38 to the driving bell crank 58. After the hook 300 is disengaged from the stud 306 further rotation of the treadle controlled rock shaft 116 is permitted to actuate the main driving clutch to start the machine.

The shoe is supported in the machine by the lower feed roll 182 and by a work support 316, see Fig. 10, the base of which is provided with a tongue 318 fitting into a corresponding groove in the end plate 320, to which latter plate the work support is fixed by screw 322. The end plate 320 is fixed to the forward extension 324 of the frame upon which is a web 326 carrying the bearing 188 for the front end of the shaft 32. The work support 316 is provided with an aperture indicated at 332 through which access may be had to the loop taker 30 to clear the looper of thread or for any other purpose.

The rolls are rotated during the upstroke of the needle and after the needle has withdrawn from the work. The lasting action of the rolls is therefore effected in a step-by-step manner progressively around the shoe, the upper being acted upon each time the needle leaves the work and being immediately secured to the sole in lasted position while firmly held in this position by the grip of the rolls. It will be noted that the needle moves diametrically across the ends of the rolls and thus enters the work directly in line with the bite of the rolls. There is, therefore, no possibility of the lasting effect being lost before the upper is secured to the sole. Also, with this arrangement, of the needle and rolls, the parts are very compactly arranged, so that the operator is enabled to swing the shoe in any desired manner as it is fed through the machine, and the seam which secures the upper in lasted position can be accurately located close to the side of the last all around the shoe. The manipulation of the shoe and the proper location of the seam is also facilitated by the fact that the upper roll is frustro-conical in shape with its base of larger diameter directed outwardly towards the shoe last.

As so far described, the operation of the machine in lasting a stitchdown shoe is as follows. With the sole tacked to the last and the upper drawn loosely over the last and held in properly centered relation thereupon by the operator, the marginal extension of the sole and the flaring edge of the upper overlying such extension of the sole are introduced between the two feed rolls and the treadle depressed to clamp the marginal portions of upper and sole together in the relation shown in Fig. 10. With the engagement of the clutch, the needle pierces the work and makes its first stitch uniting the upper and sole, and as the needle leaves the work, the feed rolls feed the shoe one stitch length to the left. As stated hereinbefore, the top feed roll 180 is adapted to be rotated at a rate of speed greater than that of the lower feed roll 182, with the result that the sole, and consequently the shoe as a whole, is fed at a rate of speed determined mainly by the speed of the lower roll, while the upper is fed by the top roll at a greater rate of speed so that the material of the upper is gathered slightly into each stitch made by the needle. That is, the upper is drawn a slight amount around the last in the general plane of the sole by the action of the top roll each time the needle leaves the work. The upper is thus drawn tightly around the last and its fullness disposed of with a smooth uniformity which prevents the formation of all visible puckers or gathers. While the gathering action is controlled by the rate of excess speed of the top roll 180 as adjusted by the position of the hand lever 256 on the outside of the machine, an additional safeguard arises from the ratchet-like action of the Horton clutch driving the lower feed roll 182. Thus, when the gathering action has taken up all the slack available about the shoe, and has drawn the upper tightly against the sides of the last, the shoe is fed by the top roll alone without producing relative movement of the upper with respect to the sole margin, and the lower roll 182 is carried along at a speed equal to that of the top roll, and in excess of the speed normally imparted to it by its Horton clutch driving device. Thus, the upper margin is not torn or scarred, and the upper is not pulled out of position and distorted upon the last. To control this action of the lower roll and to adjust such action to the requirements of various types of shoes, of softer or stiffer upper stock, a saddle 334 is applied to the rectangular peripheral groove 336, as shown in Fig. 13, about the lower roll to act with an adjustable braking effect, this saddle having a circular hole whereby it is mounted on an eccentric portion 338 of a pin put through a hole in the end plate 320. The forward end of this pin is provided with a slot 340 by means of which it may be rotated to press the concave end of the saddle with more or with less force as desired against the lower roll, to adjust its retarding action which tends to hold the lower roll down to the speed normally imparted to it by its own Horton clutch and to prevent it and the sole margin with which it is engaged from being carried along at the greater speed of the top roll 180. This adjustment also serves to prevent the stitch being unnecessarily lengthened by the faster rotation of the top roll. A nut 342 is applied to the threaded end of this pin to maintain the angular adjustment given it. The saddle also serves as an auxiliary support for the end of the shaft 32 by bracing the lower roll against the downward pressure of the work.

In addition to the means above described for drawing the upper around the last in the direction of feed, the illustrated machine is provided with means cooperating with the feed rolls for exerting a pull on the upper transversely of the direction of feed which may be varied as desired as the lasting operation progresses around the shoe. As illustrated, this means comprises a guard and guide 238 on the outer end of the stud 236 supporting the upper roll 180. This guard and guide is a projection, best shown in Figs. 10 and 11, in the form of a vertically arranged rib which projects transversely of the direction of feed a sufficient extent to form a guard protecting the needle from contacting with the shoe upper. The outer surface of this rib, as indicated in Figs. 6, 7, 9, and 10 is arranged to bear against the last supported upper and form a guide for the shoe so that when the shoe is held in the machine with the side of the last opposite the bite of the rolls at an angle to the direction of feed or, in other words, to the direction in which the rolls 180, 182 tend to feed the work, the entire shoe is moved outwardly or transversely to the direction of feed as it is forced forward in the direction of feed by the rolls. This action of the guide in forcing the shoe transversely to the direction of feed is clearly indicated by the arrows in Figs. 24 and 25, and it will be obvious from an inspection of these figures, that the extent to which the shoe is moved transversely can be regulated by varying the inclination of the side of the last at the sewing point to the normal direction of feed. During this transverse movement of the shoe, the sole moves with the last, slipping outwardly over the surface of the lower roll. The upper, being more or less loose on the last, however, does not move with the last and sole, but is held at its margin by the upper roll, slipping over the surface of the sole until the pull exerted on the upper becomes sufficient to cause the upper to slip outwardly under the roll. To cause the rolls to perform their feeding function with certainty and still permit the sole to slip outwardly over the lower roll and the upper to slip outwardly under the upper roll before being torn, their peripheral surfaces are provided with suitably shaped longitudinally extending grooves or teeth. In the case of the lower roll, these grooves, best shown in Fig. 10, are of the same depth throughout, while in the case of the upper roll, the grooves are deepest at the inner edge of the roll and merge into a cylindrical surface at the outer end of the roll.

The means for cutting the thread, with which the machine is provided, comprise a curved blade 344 (Figs. 3 and 11) mounted by means of screws 346 upon a lever 348 which is pivoted by means of an integral pin 350 in a bearing in the end-plate 320 applied to the machine frame. This lever is provided with a contracting spiral spring 352 anchored by a pin in the frame and attached to an eye in the end of an arm 354 on the lever, the spring tending to move the lever so as to bring the cutting end of the blade 344 across the path of the needle just below the top of the work rest 316. The work rest is cut away to admit the blade between its rearward surface and the lower feed roll, and the pin 350 has a finger 356 affixed upon it by means of a clamping screw 358 and bearing a screw 359 located so as to encounter a lug 360 on the end-plate and thus adjustably determine the extent of travel of the blade 344 in a direction toward the path of the needle. The end of the lever 348 that is away from the blade is adapted to be engaged by one end of a lever 362 pivoted at 364 upon the frame of the machine and attached by a screw 366 to one end of a link 368, the other end of which is attached by screw 370 to the extreme end of arm 270 formed upon the member 272, the rotation of which latter serves to raise and lower the top feed roll. When the top roll is raised to free the work and permit its withdrawal from the machine, the member 272 assumes the relation shown in Fig. 6, pulling upwardly on the link 368 and carrying the free end of lever 362 away from the lever 348 on which the blade is mounted and permitting such lever and its attaching blade to swing under the influence of its spring 352 and thus to bring the blade across the path of the needle in the manner shown in detail in Figs. 17 and 23. In such figures, it is shown that the blade has an oblique cutting edge which is thrust across the needle-path so as to cut only one side of the loop that is held by the looper, between the looper and the needle. This is capable of being effected because the two sides of the loop stand in the relation shown in Figs. 22 and 23 as the needle rises, and the screw 359 is carefully adjusted to secure the cutting of the rearward side of the loop. The engagement of the lever carrying the blade with the actuating lever 362 is through an antifriction bearing formed by a ball 372 caged in the end of lever 362, and means for adjusting the length of the link 368 is provided in the form of a turn buckle 374 intermediate the extent of the link, so that when the top roll is lowered, the blade is swung laterally away from the path of the needle and comes to rest a slight distance within the circumference of the lower roll 182, the forward surface of such lower roll acting as a support to guide the blade across the path of the needle when the blade makes its cutting stroke. It is to be noted that the thread cutter is actuated outwardly away from the path of the needle and against the contraction of its spring 352 by a toggle linkage comprising the arm 270 and the link 368, the center of the pivot 370 joining these two members being adapted to pass beyond the line joining the center of the pivot 274, about which the arm 270 swings, with the center of the pivot 366 at the lower end of the link, when the top roll is down and the screw 290 on arm 292 of member 272 has brought up against the frame of the machine. Thus the thread is parted beneath the work simultaneously with the beginning of the lifting of the top roll away from the work, and the shoe may be withdrawn from the machine or the stitching transferred to another point in the circuit of the shoe immediately upon completion of the upward or stopping movement of the starting treadle 14. The top roll is lifted from the work just as the needle reaches the limit of its upward stroke and substantially simultaneously with the disconnection of the needle bar from its actuating mechanism. The thread cutter is thus thrown into operation in time with the operation of the rotating looper and cuts the last loop taken from the needle by the looper while the loop is held distended by the looper. The side of the loop leadng to the needle and thread supply is cut and thus a length of thread is left projecting from the work sufficient to prevent the unravelling of the seam and also, since the needle at this time is at the top of its stroke, the end of the thread extending from the needle loop is of sufficient length to start the next seam.

The machine is provided with other thread handling devices comprising a tension 376 through which the thread is drawn as it leaves the holder 24 for the package of thread constituting the supply, and comprising also a pull-off 380 on the end of a lever 382 pivoted at 384 on a bracket 386 mounted on top of the machine, such lever being connected by means of a link 388 with the end of an arm 390 that is fixed on the control shaft 116 within the machine, the arrangement being such that as the treadle is allowed to rise and rock such shaft, the pull-off draws aside sufficient thread between the guides 392 and 394 to provide slack for the downward stroke of the needle and subsequent action of the looper in forming the first stitch at the beginning of a seam. A thread lock 396 operated by a light spring 398 prevents the thread puller 380 from drawing the thread backward through the eye of the needle, and compels the thread to be drawn instead from the supply. An adjustable tension 400 is also provided on the bracket 386. The thread next is passed through a thread lubricating device comprising a tank 402 mounted on the top of the machine having journalled therein at 404 a roll 406 which dips below the surface of the lubricant lying within the receptacle at a level such as indicated at 408. The thread is lubricated by passing over and rotating the roll in obvious manner.

The take-up is of well-known construction, and includes a member 410 fixed on top of the machine and having a plurality of holes arranged at different levels, the thread being run through the appropriate one thereof and carried through the hooked upper end of a member 412 also mounted in fixed relation on top of the machine, the thread thence passing down across the bulging front end of the machine to the eye of the needle, lying along the grooves 414 formed therein. The member 412 has a light spring 416 between which and the adjacent portion 418 intermediate the length of the member 412 the thread is wedged as the needle starts downward and during the loop-taking the thread is pulled into the space near the attached end of the spring. The needle bar 34 has a member 420 applied by a screw 422 to its upper extremity, such member encircling the member 412 and its spring 416. As the needle bar rises, this member slides up along the member 412, forcing the thread up between the spring and the member 412 and pulling upwardly on the lead of thread extending down through the eye of the needle and through the work and thus acting as a take-up to set the stitch.

The stitch forming devices of the illustrated machine are designed to operate upon heavy stock such as is found in the soles of stitchdown shoes, and in order to insure the accurate location of the needle with relation to the looper when the needle is at the bottom of its stroke, regardless of the resistance offered by the work to the passage of the needle and the consequent tendency of the work to deflect the needle, guides or guards are provided which prevent such deflection and compel the needle to assume a position at the bottom of its stroke in which the looper will enter the loop thrown out at the side of the needle as the needle begins its retracting stroke. One of these guides is provided above the work by the outer end of the stud on which the upper roll is mounted, and another guard on the opposite side of the needle and below the work is provided by the inner surface of the work support 316. Each of these guides or guards is adjustable towards and from the needle, the adjustment of the guard formed by the outer end of the stud 236 being effected by an eccentric portion of the stud 234 on which the member 232 is mounted and which, when the stud is turned, serves to move the member 232 bodily inwardly or outwardly, and the adjustment of the guard formed by the inner surface of the work support 316 being effected by a bodily adjustment of the work support 316 which is permitted by slots formed in the work support through which the securing screws 322 pass.

The illustrated machine is also provided with a combination circulating and splash system of lubrication for the moving parts of the head. To this end a supply of oil is designed to be retained in the base of the head, up to a level such as is indicated at 424, Fig. 14, whence it is picked up by the gears 426 of a gear pump driven by a gear 428 that is fixed on the shaft 32 of the machine. The oil is thus impelled through the pipes 428, 430, 432 to the top of the machine, where it is ejected through orifices 434 onto the stud 40 and the bell cranks pivoted thereon, the bell cranks being provided with cups 436 admitting a part of the oil to their bearing surfaces, while the remainder is sprayed and splashed over all other parts of the interior of the machine. The point 438, Fig. 6, formed on the machine frame just at the rear of the lower bearing for the needle bar, is designed to allow a slight amount of oil, trickling down the surface of the lug 298 which acts as a stop for the member 272 as described hereinbefore, to drip on the moving parts of the top roll and its mounting and actuating devices. The excess oil from these parts descends onto the driving and supporting means for the lower roll, thence to the thread cutter and its connections and then rejoins the supply in the base of the machine.

The nature and scope of the invention having been indicated, and a machine embodying the several features of the present invention having been specifically described, what is claimed is:

1. A machine for lasting stitchdown shoes having, in combination, an upper engaging roll, a member between which and the peripheral surface of the roll the out-turned upper and sole are gripped, and means for rotating the roll and guiding the work to draw the upper over the last progressively along the shoe.

2. A machine for lasting stitchdown shoes having, in combination, an upper engaging roll, a sole engaging roll between which and the peripheral surface of the upper engaging roll the out-turned upper and sole are gripped, and means for rotating the rolls and guiding the work to draw the upper over the last progressively along the shoe.

3. A machine for lasting stitchdown shoes having, in combination, a frusto-conical upper engaging roll arranged with its end of larger diameter directed towards a shoe placed in the machine, a member between which and the peripheral surface of the roll the out-turned upper and sole are gripped, and means for rotating the roll and guiding the work to draw the upper over the last progressively along the shoe.

4. A machine for lasting stitchdown shoes having, in combination, an upper engaging roll, a member between which and the peripheral surface of the roll the out-turned upper and sole are gripped, means for rotating the roll to feed the shoe, and means engaging the shoe and forcing it longitudinally of the roll as it is fed.

5. A machine for lasting stitchdown shoes having, in combination, an upper engaging roll, a member between which and the peripheral surface of the roll the out-turned upper and sole are gripped, means for rotating the roll to feed the shoe, and means for causing the shoe to move longitudinally of the roll as it is fed.

6. A machine for lasting stitchdown shoes having, in combination, an upper engaging roll, a work supporting roll between which and the peripheral surface of the upper engaging roll the out-turned upper and sole are gripped, and means for rotating the rolls acting to impart a greater peripheral speed to the upper engaging roll to gather the upper about the last.

7. A machine for lasting stitchdown shoes having, in combination, an upper engaging roll, a work supporting roll between which and the peripheral surface of the upper engaging roll the out-turned upper and sole are gripped, means for rotating the rolls acting to impart a greater peripheral speed to the upper engaging roll to gather the upper about the last, and means for varying the relative peripheral speeds of said rolls.

8. A machine for lasting stitchdown shoes having, in combination, an upper engaging roll, a work supporting roll between which and the peripheral surface of the upper engaging roll the out-turned upper and sole are gripped, means for rotating the rolls acting to impart a greater peripheral speed to the upper engaging roll, and means engaging the shoe and forcing it longitudinally of the rolls as it is fed.

9. A machine for lasting stitchdown shoes having, in combination, work supporting and feeding means including an upper engaging roll and a work support between which and the peripheral surface of the roll the out-turned upper and sole are gripped, and means for causing the shoe to move longitudinally of the roll as it is fed.

10. A machine for lasting stitchdown shoes having, in combination, work supporting and feeding means including an upper engaging member and a cooperating member between which the out-turned upper and sole are gripped, and means for causing the shoe to move with relation to said upper engaging member transversely of the direction of feed as the shoe is fed.

11. A machine for lasting stitchdown shoes having, in combination, work supporting and feeding means including an upper engaging member and a cooperating member between which the out-turned upper and sole are gripped, and means for moving the work contacting surface of the upper engaging member with relation to the work contacting surface of the cooperating member in the direction of feed to gather the upper about the last.

12. A machine for lasting stitchdown shoes having, in combination, work supporting and feeding means including an upper engaging member and a cooperating member between which the out-turned upper and sole are gripped, means for moving the work contacting surface of the upper engaging member with relation to the work contacting surface of the cooperating member in the direction of feed to gather the upper about the last, and means for varying such relative movement.

13. A machine for lasting stitchdown shoes having, in combination, work supporting and feeding means including an upper engaging member and a cooperating member, between which the out-turned upper and sole are gripped, and means for relatively moving the shoe and the upper engaging member transversely of the direction of feed while the out-turned upper and sole are gripped.

14. A machine for lasting stitchdown shoes having, in combination, work supporting and feeding means including an upper engaging roll and a cooperating member between which the out-turned upper and sole are gripped, and means for rotating the roll to move its work contacting surface with relation to the work contacting surface of the cooperating member in the direction of feed to gather the upper about the last.

15. A machine for lasting stitchdown shoes having, in combination, work supporting and feeding means including an upper engaging roll and a cooperating member between which the out-turned upper and sole are gripped, means for rotating the roll to move its work contacting surface with relation to the work contacting surface of the cooperating member in the direction of feed to gather the upper about the last, and means for causing the shoe to move longitudinally of the roll as it is fed.

16. A machine for lasting stitchdown shoes having, in combination, an upper engaging roll, a work supporting roll between which and the peripheral surface of the upper engaging roll the out-turned upper and sole are gripped, and means for rotating the rolls arranged to impart a greater peripheral speed to the upper engaging roll and to permit the work supporting roll to be rotated ahead of its driving means by its engagement with the work.

17. A machine for lasting stitchdown shoes having, in combination, an upper engaging roll, a work supporting roll between which and the peripheral surface of the upper engaging roll the out-turned upper and sole are gripped, means for rotating the rolls arranged to impart a greater peripheral speed to the upper engaging roll and to permit the work supporting roll to be rotated ahead of its driving means by its engagement with the work, and breaking means for retarding the rotation of the work supporting roll.

18. A machine for lasting stitchdown shoes having, in combination, an upper engaging roll, a member between which and the roll the out-turned upper and sole are gripped, means for rotating the roll and guiding the work to draw the upper over the last progressively along the shoe, and stitch-forming mechanism for forming a seam to secure the upper to the sole while gripped between said roll and member.

19. A machine for lasting stitchdown shoes having, in combination, an upper engaging roll, a member between which and the peripheral surface of the roll the out-turned upper and sole are gripped, means for rotating the roll and guiding the work to draw the upper over the last progressively along the shoe, and means for securing the upper to the sole while gripped between the roll and said member.

20. A machine for lasting stitchdown shoes having, in combination, work supporting and feeding means including an upper engaging member and a cooperating member between which the out-turned upper and sole are gripped, means for causing the shoe to move with relation to said upper engaging member transversely of the direction of feed as the shoe is fed, and means for securing the upper to the sole while gripped between said members.

21. A machine for lasting stitchdown shoes having, in combination, work supporting and feeding means including an upper engaging member and a cooperating member between which the out-turned upper and sole are gripped, means for moving the work contacting surface of the upper engaging member with relation to the work contacting surface of the cooperating member in the direction of feed to gather the upper about the last, and means for securing the upper to the sole while gripped between said members.

22. A machine for lasting stitchdown shoes having, in combination, an upper engaging roll, a work supporting roll between which and the peripheral surface of the upper engaging roll the out-turned upper and sole are gripped, means for rotating the rolls, a needle operating diametrically across the ends of the rolls, a guard to protect the last supported upper from the needle, and means cooperating with the needle to form a seam securing the upper to the sole while gripped between the rolls.

23. A machine for lasting stitchdown shoes having, in combination, a frustro-conical upper engaging roll arranged with its end of larger diameter directed towards a shoe placed in the machine, a member between which and the peripheral surface of the roll the out-turned upper and sole are gripped, means for rotating the roll and guiding the work to draw the upper over the last progressively along the shoe, a needle operating diametrically across the end of the roll, a guard to protect the last supported upper from the needle, and means cooperating with the needle to form a seam securing the upper to the sole while gripped between the roll and the work support.

24. A machine for lasting stitchdown shoes having, in combination, work supporting and feeding means including an upper engaging roll and a cooperating member between which the out-turned upper and sole are gripped, means for rotating the roll to move its work contacting surface with relation to the work contacting surface of the cooperating member in the direction of feed to gather the upper about the last, means for causing the shoe to move longitudinally of the roll as it is fed, a needle operating diametrically across the end of the roll, and means cooperating with the needle to form a seam securing the upper to the sole while gripped between the roll and said cooperating member.

25. A machine for lasting stitchdown shoes having, in combination, an upper engaging roll, a member between which and the peripheral surface of the roll the out-turned upper and sole are gripped, means for rotating the roll, a needle operating diametrically across the end of the roll, a guard to protect the last supported upper from the needle, and means cooperating with the needle to form a seam to secure the upper to the sole while gripped between the roll and work support.

26. A machine for lasting stitchdown shoes having, in combination, an upper engaging roll, a member between which and the peripheral surface of the roll the out-turned upper and sole are gripped, means for rotating the roll and guiding the work to draw the upper over the last progressively along the shoe, and means for limiting the amount of tension put upon the upper in being drawn over the last.

27. A machine for lasting stitchdown shoes having, in combination, work supporting and feeding means including an upper engaging roll and a work support between which and the peripheral surface of the roll the out-turned upper and sole are gripped, means for causing the shoe to move longitudinally of the roll as it is fed, and teeth on the upper engaging roll extending longitudinally of the roll permitting the upper to slip before the tension on the upper exceeds a predetermined amount.

28. A machine for lasting stitchdown shoes having, in combination, work supporting and feeding means including an upper engaging member and a cooperating member, between which the out-turned upper and sole are gripped, means for relatively moving the shoe and the upper engaging member transversely of the direction of feed while the out-turned upper and sole are gripped, and means for limiting the amount of tension put upon the upper during the relative movement of the shoe and upper engaging member.

29. A machine for lasting stitchdown shoes having, in combination, work supporting and feeding means including an upper engaging member and a cooperating member between which the out-turned upper and sole are gripped, means for moving the work contacting surface of the upper engaging member with relation to the work contacting surface of the cooperating member in the direction of feed to gather the upper about the last, and means for limiting the amount of tension put upon the upper during the gathering action.

30. A machine for lasting stitchdown shoes having, in combination, work supporting and feeding means including an upper engaging member and a cooperating member between which the out-turned upper and sole are gripped, means for moving the work contacting surface of the upper engaging member with relation to the work contacting surface of the cooperating member in the direction of feed to gather the upper about the last, and means permitting said surfaces to move in unison when the tension on the upper, due to the gathering action exceeds a predetermined amount.

31. A machine for lasting stitchdown shoes having, in combination, a pair of rolls adapted to engage at their bite the out-turned margin of the upper and the projecting margin of the sole of a stitchdown shoe, a needle arranged for reciprocation between the rolls and the side of the last, and a combined guard for the needle and the guide for the shoe located close to and in advance of the needle in the line of feed.

32. A machine for lasting stitchdown shoes having, in combination, means for progressively securing an out-turned upper to the projecting margin of the sole, means acting continuously at the point where the upper is being secured to clamp the upper and sole together, means for moving the clamping means to feed the work, and a guide engaging the side of the shoe to prevent movement of the shoe toward the clamping means.

33. A machine for lasting stitchdown shoes having, in combination, means for progressively securing an out-turned upper to the projecting margin of the sole, means acting continuously at the point where the upper is being secured to clamp the upper and sole together, means for moving the clamping means to feed the work, and a guide engaging the side of the shoe to prevent movement of the last toward the clamping means while permitting the shoe to be held at an angle to the direction of feed of the shoe, said clamping means and guide being so constructed and arranged relatively to the shoe so presented that incremental stretching of the upper over the last is effected during the feeding of the shoe.

34. A machine for lasting stitchdown shoes having, in combination, means for sewing an out-turned upper to the projecting margin of a sole, means acting continuously at the point where the upper is being sewed to clamp the upper and sole together, means for moving the clamping means to feed the work, and a guide engaging the side of the shoe to prevent movement of the shoe toward the clamping means, said guide being narrow in the direction of the length of the shoe to enable the shoe to be held at an angle to the direction of feed of the shoe, the guide and clamping means being so constructed and arranged that the shoe so presented will have its upper tensioned over the last and the degree of said tension will be directly proportional to the angle at which the side of the shoe at the operating point is held to the direction of feed.

35. A machine for lasting stitchdown shoes having, in combination, a pair of rolls adapted to engage at their bite the out-turned margin of the upper and the projecting margin of the sole of a stitchdown shoe, and sewing means comprising a needle acting diametrically of the rolls between the bite of the rolls and the shoe to secure the upper and sole together substantially in the angle between the side of the last and the projecting margin of the sole.

36. A machine for lasting stitchdown shoes having, in combination, a pair of rolls adapted to engage at their bite the outer portion of the out-turned margin of the upper and the projecting margin of the sole of a stitchdown shoe, a needle arranged for reciprocation between the rolls and the side of the last, a combined guard for the needle and guide for the shoe located close to and in advance of the needle in the line of feed, and means for intermittently turning the rolls to effect feeding of the shoe while the rolls continuously hold the upper and sole together at the operating point, the seam formed by the needle acting to draw the upper while its margin is so held into the angle between the side of the last and the projecting margin of the sole.

37. A machine for lasting stitchdown shoes having, in combination, means acting substantially in the angle between the side of the last and the projecting margin of the sole for progressively securing an out-turned upper to the projecting margin of the sole, rotary clamping means acting continuously adjacent to the point where the upper is being secured to clamp the upper and sole together, means for actuating the rotary clamping means to feed the shoe, and a guide engaging the side of the shoe to prevent movement of the shoe toward the rotary means.

38. A machine for lasting stitchdown shoes having, in combination, a pair of rolls adapted to engage at their bite the outturned margin of the upper and the projecting margin of the sole of a stitchdown shoe, means for intermittently turning the rolls and for turning the upper engaging roll faster than the sole engaging roll to dispose of the fullness of the upper, a brake on the sole engaging roll to limit the action of the upper roll in disposing of the fullness of the upper, a needle arranged for reciprocation between the rolls and the side of the last, a combined guard for the needle and guide for the shoe located close to and in advance of the needle in the line of feed, the rolls and guide being so constructed and arranged that tensioning of the upper over the last may be effected by presentation of the side of the shoe at the operating point at an angle to the direction of the line of feed of the rolls, and teeth on the rolls extending at right angles to the direction of feed of the rolls so that the feeding grip of the rolls on the shoe upper is positive and slipping of the upper under the upper engaging roll is permitted when the tension on the upper exceeds a desired maximum.

39. A machine for lasting stitchdown shoes having, in combination, a pair of rolls adapted to engage at their bite the out-turned margin of the upper and the projecting margin of the sole of a stitchdown shoe, a needle arranged for reciprocation between the rolls and the side of the last, a combined guard for the needle and guide for the shoe located close to and in advance of the needle in the line of feed, means for intermittently turning the rolls to effect feed of the upper while the rolls continuously hold the upper and sole together, said guide and rolls being so constructed and arranged that the shoe may be presented with the side of the last at the operating point at an angle to the direction of feed so that the rolls and guide will cooperate to effect an incremental tensioning of the upper over the last during each feeding movement of the rolls, and teeth on the upper engaging roll extending transversely of the direction of feed and permitting the upper to slip when the sum of the tension increments exceeds a predetermined limit.

40. A machine for lasting stitchdown shoes having, in combination, an upper engaging roll, a work supporting roll between which and the peripheral surface of the upper engaging roll the out-turned upper and sole are gripped, means for rotating the rolls, and means operating on stopping the machine to separate the rolls.

41. A machine for lasting stitchdown shoes having, in combination, an upper engaging roll, a work supporting roll between which and the peripheral surface of the upper engaging roll the out-turned upper and sole are gripped, means for rotating the rolls, and means operating on starting the machine to bring the rolls into gripping engagement with the work.

42. A machine for lasting stitchdown shoes having, in combination, an upper engaging roll, a work supporting roll between which and the peripheral surface of the upper engaging roll the out-turned upper and sole are gripped, means for rotating the rolls, means operating on starting the machine to bring the rolls into gripping engagement with the work, and means operating on stopping the machine to separate the rolls.

43. A machine for lasting stitchdown shoes having, in combination, an upper engaging roll, a work support between which and the peripheral surface of the roll the out-turned upper and sole are gripped, means for rotating the roll, a roll carrier, a toggle connected to the carrier, arranged to hold the roll in engagement with the work when the toggle is in substantially straightened position and to permit the roll to move away from the work when the toggle is broken, and means under the control of the operator for straightening and breaking the toggle.

44. A machine for lasting stitchdown shoes having, in combination, an upper engaging roll, a work support between which and the peripheral surface of the roll the outturned upper and sole are gripped, means for rotating the roll, a roll carrier, a toggle connected to the carrier comprising an end-wise yielding link for holding the roll in engagement with the work when the toggle is in substantially straightened position, a spring acting to move the roll away from the work when the toggle is broken, and means under the control of the operator for straightening and breaking the toggle.

45. A machine for lasting stitchdown shoes having, in combination, an upper engaging roll, a work support between which and the peripheral surface of the roll the out-turned upper and sole are gripped, means for rotating the roll, a roll carrier, a toggle connected to the carrier comprising an end-wise yielding link for holding the roll in engagement with the work when the toggle is in substantially straightened position, stops for limiting the breaking and straightening movements of the toggle, and means under the control of the operator for straightening and breaking the toggle.

46. A machine for lasting stitchdown shoes having, in combination, an upper engaging roll, a work supporting roll between which and the peripheral surface of the upper engaging roll the out-turned upper and sole are gripped, a power driven shaft and suitable connections for rotating the rolls, and means controlled by the operator for moving the rolls into gripping engagement with the work and for thereafter connecting the shaft to its source of power.

47. A machine of the class described having, in combination, a feed roll, a member cooperating therewith between which and the peripheral surface of the feed roll the work is gripped, means for rotating the roll, a needle operating diametrically across the end of the roll, and means cooperating with the needle to form a seam in the work.

48. A machine of the class described having, in combination, a feed roll, a member cooperating therewith between which and the peripheral surface of the feed roll the work is gripped, an eye-pointed needle located on the same side of the work as the feed roll and operating diametrically across the end of the roll, and means cooperating with the needle to form a chain stitch seam in the work.

49. A machine of the class described having, in combination, a feed roll, a work supporting roll between which and the peripheral surface of the feed roll the work is gripped, means for rotating the rolls, an eye-pointed needle operating diametrically across the ends of the rolls, and means including a rotary looper mounted concentrically with the axis of the work supporting roll cooperating with the needle to form a chain stitch seam in the work.

50. A machine of the class described having, in combination, a feed roll, a work supporting roll between which and the peripheral surface of the feed roll the work is gripped, means for rotating the rolls, a needle operating diametrically across the ends of the rolls, and means cooperating with the needle to form a seam in the work.

51. A machine of the class described having, in combination, means for supporting and feeding the work, an eye-pointed needle, means including a rotary looper cooperating with the needle to form a chain stitch seam in the work, a power driven shaft and suitable connections for actuating the needle and the looper, a thread cutter, and means operating on stopping the machine to disconnect the needle from said shaft, and to actuate the thread cutter to sever a loop held by the looper.

52. A machine of the class described having, in combination, means for supporting and feeding the work, an eye pointed needle, means including a rotary looper cooperating with the needle to form a chain stitch seam in the work, a power driven shaft and suitable connections for actuating the needle and looper, a treadle and suitable connections for connecting and disconnecting the shaft and a source of power at will, a thread cutter, and means controlled from the treadle for actuating the thread cutter on stopping the machine to sever a loop held by the looper.

53. A machine of the class described having, in combination, a feed roll, a work supporting roll between which and the peripheral surface of the feed roll the work is gripped, a needle operating diametrically across the ends of the rolls, means cooperating with the needle to form a seam in the work, a power driven shaft, connections between said shaft and needle for actuating the needle, means actuated by said connections for rotating the rolls, and means for rendering said connections inoperative and thereby stop the movement of the needle and rolls during the continued rotation of the power driven shaft.

54. A machine of the class described having, in combination, a feed roll, a work supporting roll between which and the peripheral surface of the feed roll the work is gripped, means for rotating the rolls, a needle operating diametrically across the ends of the rolls, means cooperating with the needle to form a seam in the work, a power driven shaft and suitable connections for actuating the needle, and means operating on stopping the machine to separate the rolls and to disconnect the needle from said shaft to stop the movement of the needle during the continued rotaton of the shaft.

55. A machine of the class described having, in combination, a feed roll, a work support between which and the peripheral surface of the roll the work is gripped, a needle operating diametrically across the end of the roll, means cooperating with the needle to form a seam in the work, a power driven shaft and suitable connections for actuating the needle, and means actuated by said connections for rotating the roll.

56. A machine of the class described having, in combination, an upper engaging roll, a work support between which, and the peripheral surface of the roll the work is gripped, means for rotating the roll, an eye-pointed needle operating diametrically across the end of the roll, means including a rotary looper cooperating with the needle to form a chain-stitch seam in the work, a power driven shaft and suitable connections for actuating the needle and looper, and means operating on stopping the machine to disconnect the needle from said shaft to stop the movement of the needle during the continued movement of said shaft and looper.

57. A machine of the class described having, in combination, an upper engaging roll, a work support between which and the peripheral surface of the roll the work is gripped, means for rotating the roll, an eye-pointed needle operating diametrically across the end of the roll, means including a rotary looper cooperating with the needle to form a chain-stitch seam in the work, a power driven shaft and suitable connections for actuating the needle and looper, a thread cutter, and means operating on stopping the machine to disconnect the needle from said shaft and to actuate the thread cutter to sever a loop held by the looper.

In testimony whereof I have signed my name to this specification.

BERNARD T. LEVEQUE.